2,218,910

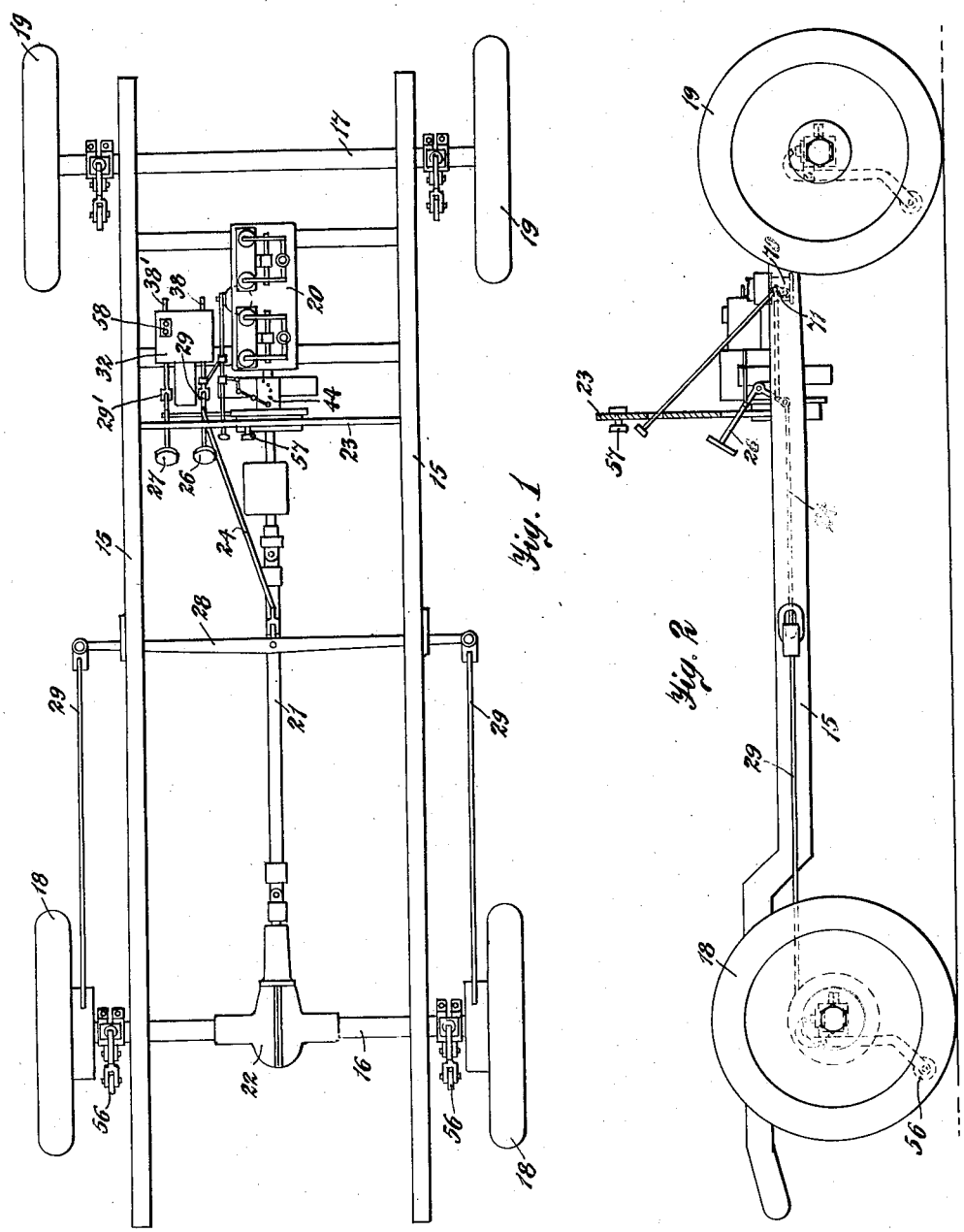

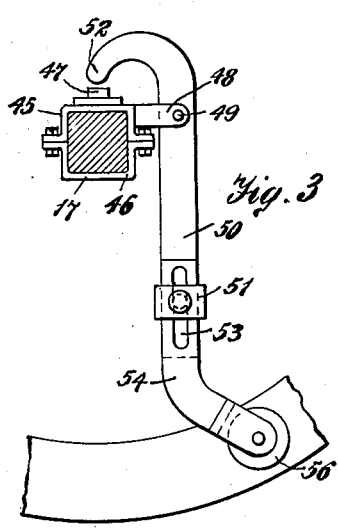
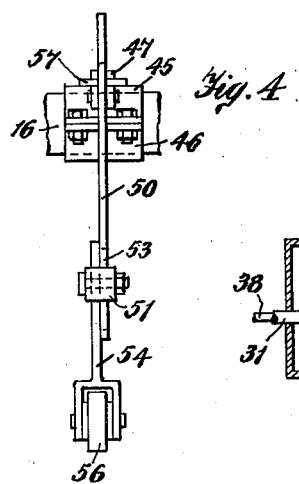
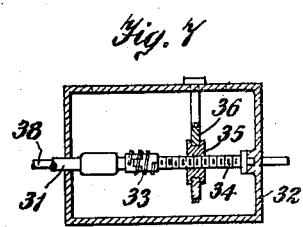
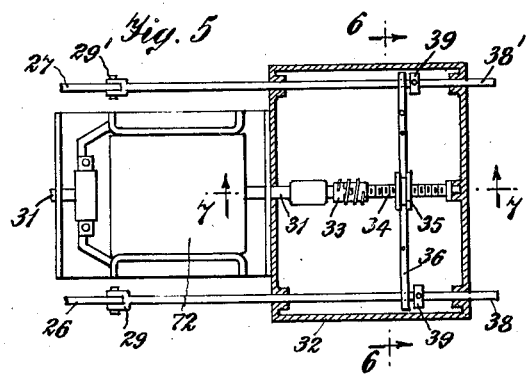
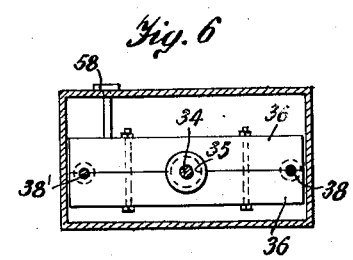
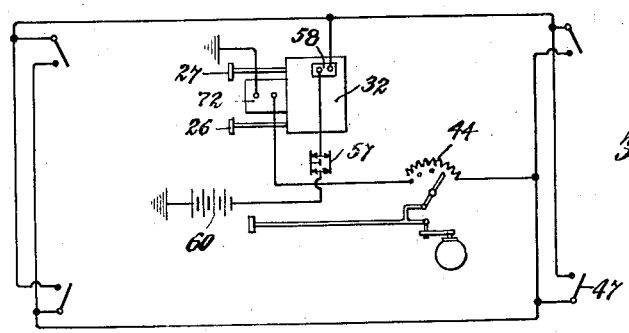
INVENTOR.
ALVIN A. HILL
ATTORNEY Patented Oct. 22, 1940

UNITED STATES PATENT OFFICE 2,218,910

AUTOMATIC SAFETY CONTROL FOR MOTOR PROPELLED VEHICLES

Alvin A. Hill, Passaic, N. J.

Application February 16, 1939, Serial No. 256,669

3 Claims. (Cl. 188—111)

This invention relates to safety devices for self-propelled vehicles and more particularly to such devices as may be applied to vehicles as presently constructed.

An object of the invention is to provide a control means in nowise conflicting with the usual operation of a vehicle except in an emergency, in which event the vehicle is brought to a full stop.

Another purpose is to produce a device operative to effectually stop the vehicle on which it is equipped upon deflation of any of its tires from any cause.

These important objects are accomplished by the novel construction, combination and arrangement of parts hereinafter described and illustrated in the accompanying drawings, constituting a component of this disclosure, and in which:

Figure 1 is a top plan view of a conventional type of vehicle chassis showing embodiments of the invention as applied thereto.

Figure 2 is a side elevational view of the same.

Figure 3 is a fragmentary transverse sectional view of an axle, showing part of a tire and control mechanism in side elevation, drawn to an enlarged scale.

Figure 4 is a front elevational view of the same, the tire omitted.

Figure 5 is a partial plan, partial horizontal sectional view of the vehicle under body and parts associated therewith.

Figure 6 is a transverse sectional view taken on line 6—6 of Figure 5.

Figure 7 is a longitudinal sectional view taken on line 7—7 of Figure 5.

Figure 8 is a diagrammatic view of the electrical system used.

Referring in greater detail to the drawings, Figures 1 and 2 show the main elements of a chassis or under frame consisting of a pair of beams 15 supported on a drive axle housing 16 at the rear and front axle 17, the former having the usual drive wheels 18 and the latter provided at its ends with dirigible wheels 19, all having inflatable tires.

An engine, generally designated by the numeral 20, provides power transmitted by the shaft 21 to differential gears enclosed in a housing 22 together with rear axle also enclosed in housing 16 in usual manner.

A dash board 23 carries usual instruments and a steering wheel, not shown, controls the course of the vehicle which is further provided with brake and clutch pedals 26 and 27; a cross bar 28 connecting the brake rods 29 is made operable by a short rod 24 engaging the center of the bar 28 at one end, the opposite end being pivoted to the lower end of the brake pedal 26, all these several parts being well known and form no part of the present invention.

Mounted in the front of the vehicle, preferably under the engine hood, is a motor 72 provided with a Bendix device, having a divided shaft, see Figure 5, one end 31 extending rearward forming an armature shaft housed in a casing 32, the other end connected flexibly to a Bendix element 33 driving a screw threaded shaft 34.

Operatively engaged on the screw is an internally threaded collar 35 having a peripheral groove by which is actuated the plates 36 rigidly bolted together in edgewise formation, and slidably held between these plates are rods 38—38', the rod 38 being pivoted at 29 to the brake pedal 26; the other rod 38' is pivoted to the clutch connecting rod 27 at 29'; the rods 38—38' carry adjustable collars 39 against which the plates 36 contact when the screw is turned in the direction to force them outwardly.

Referring to Figures 3 and 4, one of the automatic stopping devices is shown and as all are substantially alike, a single description suffices.

Fixed on the end of the axle 17, is a clamp bracket composed of upper and lower members respectively 45—46, the upper member provided with a push button having a spring contact 47 of any well known type, and also a rigid arm 48, bifurcated to receive a lever 50 pivoted on a pin 49.

The lever 50 has a curved extension 52 adapted to close the switch 47 when pressed forcibly thereagainst and its lower portion is slotted, as at 53, to adjustably engage a rearwardly curved arm 54, when in adjustment by a clamp coupling 51.

The lower portion of the arm 54 is forked to receive a wheel 56 adapted to trail along the roadway in the event the tire becomes deflated, thereby obviously allowing the axis of the wheel to descend, causing the lever 50 to turn on its pivot and the element 52 contact the push button 47 closing the circuit. When this occurs the brakes are automatically applied and the car is stopped.

A switch 57 installed on the dash board 23 receives energy from a battery 60, passed through a fuse box 58 to each of the four switches 47 on the axles, return current passing through a rheostat 44 to the Bendix housing 32 and then to ground.

From the foregoing it will be seen that in case of a flat, blow out, a puncture or other reasons causing deflation of the tire the wheels 56 will make contact with the ground, the other hooked end of the lever 50 will be forced down making contact with the push button 47 closing the circuit, automatically applying the brake and throwing the clutch out of engagement, thus stopping the car.

From the foregoing it will be seen that a simple device for this purpose has been disclosed in the preferred form of its embodiment, but it is not desired to restrict the details to the exact construction shown, it being obvious that changes may be made without departing from the scope of the appended claims.

Having thus described the invention, what is claimed as new and desired to secure by Letters Patent, is:

1. In a motor driven vehicle having a plurality of wheels, inflated tires on the wheels and a source of electric current carried by the vehicle, an independent motor energizable by said electric current, braking means for each of said wheels operable by said motor, a trailer wheel rearward of each vehicle wheel adapted to contact the road surface upon deflation of the tire, levers carried by the vehicle on which said trailer wheels are mounted, and means operated by said levers to close the electric circuit upon such deflation.

2. In a motor driven vehicle having a plurality of wheels, inflated tires on the wheels and a source of electric current carried by the vehicle, an independent motor energizable by said electric current, braking means for each of said wheels operable by said motor, levers pivoted on the vehicle adjacent each of the wheels thereof, switches on said levers to control current to said independent motor, and trailer wheels carried by said levers rearward of the vehicle wheels, said trailer wheels being contactable with the ground surface upon deflation of the tires to operate said switches.

3. In a motor driven vehicle having inflatably-tired wheels, and a source of electric current, an independent motor energizable by said electric current, a screw actuable by said motor, braking means for all of said wheels, operative connections between said screw and braking means, a switch controlling the current for each wheel braking means, a lever pivoted adjacent each wheel, a wheel carried by each lever to trail behind the wheel, said wheels making contact with the roadway upon deflation of the wheel tire, and means combined with each lever to close the switch corresponding thereto whereby said independent motor is caused to operate and set all of said braking means automatically.

ALVIN A. HILL.